UNITED STATES PATENT OFFICE.

RENÉ BOHN, OF MANNHEIM, ASSIGNOR TO THE BADISCHE ANILIN AND SODA FABRIK, OF LUDWIGSHAFEN-ON-THE-RHINE, GERMANY.

BLUE ALIZARIN DYE.

SPECIFICATION forming part of Letters Patent No. 519,229, dated May 1, 1894.

Application filed December 27, 1893. Serial No. 494,884. (Specimens.) Patented in England November 12, 1891, Nos. 19,588 and 19,589, and in Germany June 5, 1892, No. 72,685.

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of Blue Alizarin Dye, (for which I have received Letters Patent in England, Nos. 19,588 and 19,589, dated November 12, 1891, and in Germany, No. 72,685, dated June 5, 1892,) of which the following is a specification.

In the United States Letters Patent Nos. 399,479, 399,480, 399,481, 399,482, 401,633, 401,634, and 401,635, granted to me, I have described various blue to green alizarin dyes which are all obtained by the action of sulfuric acid in a form or strength suitable for each case, upon certain dye-stuffs of the alizarin series. The dyes patented in these Letters Patent constitute very valuable articles of commerce.

In the specification to Letters Patent No. 502,603 I have described the production of alizarin dye giving blue shades on chromed wool, by the successive treatment of dinitro-anthraquinone (preferably 1.4′ dinitro-anthraquinone) first with fuming and then with ordinary sulfuric acid.

The present invention relates to a specific dye which is included generically in the Letters Patent aforesaid and which possesses the generic properties therein set forth while differing in several respects from the specific dye obtained by proceeding in the manner described in the example. Thus for instance it yields a redder shade of color on chromed fiber.

The 1.4′ dinitro-anthraquinone is comparatively insoluble in nearly all the usual solvents consequently in its manufacture the mother liquors contain little or none of this body but other more soluble nitro-bodies which can be regained as a by-product. Now according to my present invention I subject this by-product to successive treatment first with fuming and then with ordinary concentrated sulfuric acid in the manner hereinafter described. The said by-product consists in the main of alpha-dinitro-anthraquinone and delta-dinitro-anthraquinone; further other indefinite nitro-products which are practically immaterial in this process (see German Patent No. 72,685). It is of course possible to separate the alpha and delta dinitro-anthraquinones from one another and use the isolated bodies as the initial material, but no practical advantage is thereby gained. This by-product can also be prepared by extracting a crude dinitro-anthraquinone with acetone. I have found that the best result can not readily be obtained when treating this mixed dinitro-anthraquinone (or the isolated components) with fuming sulfuric acid containing about twelve per cent. of free anhydride ($SO_3$) in the first step according to the process described, as applied to the 1.4′ dinitro-anthraquinone, in the aforesaid specification No. 502,603; but that it is better to use a stronger acid as hereinafter set forth.

The following example will serve to illustrate the manner in which the invention can best be carried into practical effect and my new dye obtained. By parts I mean parts by weight.

Example: Mix about ten (10) parts of the dinitro-anthraquinone mixture above defined (or of the isolated alpha or beta dinitro-anthraquinone) and one to two (1 to 2) parts sulfur with about one hundred (100) parts of fuming sulfuric acid containing about forty per cent. of free anhydride (40% $SO_3$); heat the mixture to a temperature of about one hundred and thirty degrees centigrade, (130°c.) and maintain the heat for about one and a half to two hours, (1½ to 2 hrs.) A new intermediate coloring matter readily soluble in water is produced. Allow the melt to cool and when cold pour it into water, and by means of common salt precipitate the intermediate product, filter, press and dry. Next mix about one (1) part of the dry intermediate product so obtained with about ten (10) parts of ordinary concentrated sulfuric acid containing about ninety-five per cent. of real acid (95% $H_2SO_4$). Heat the mixture to about one hundred and thirty degrees centigrade, (130° c.) for about five (5) hours or until the resulting dye is practically insoluble in water. Then pour the whole into water, filter, wash with warm water, press and dry or preserve for use in the form of paste.

In the above example instead of isolating the intermediate coloring matter from the melt and treating the isolated body with concentrated sulfuric acid, a similar dye can be obtained by adding the concentrated acid to the melt and further heating this mixture till the desired almost insoluble dye is obtained. Further the strength of acid used, the temperature and the proportions described in the above example may be varied without departing from the nature of the invention.

My new dyestuff is characterized by the following properties:—It occurs in commerce in the form of paste or as a dry dark-colored powder, it is practically insoluble on stirring with cold water, but on boiling it yields a dull claret red solution which turns blue violet on boiling with alum solution, it is soluble in alcohol giving a magenta-red slightly fluorescent solution, it is almost insoluble in ether and practically insoluble in cold benzene but gives a magenta-red solution on boiling; it gives a violet-blue solution in sulfuric acid, a magenta-red solution in anilin and in glacial acetic acid.

Now what I claim is—

The new blue alizarin dye hereinbefore described which can be derived by the successive treatment of the dinitro-anthraquinones hereinbefore defined first with fuming and afterward with concentrated sulfuric acid which, when dry, appears in the form of a dark colored powder, soluble in alcohol, almost insoluble in ether and cold benzene, practically insoluble in cold water, more soluble on boiling, giving a dull claret red solution which changes in color to blue violet on boiling with alum solution, soluble in concentrated sulfuric acid giving a violet blue solution all substantially as described.

In testimony whereof I have hereunto set my hand in the presence of two subscribing witnesses.

RENÉ BOHN.

Witnesses:
ERNEST F. EHRHARDT,
ADOPH REUTLINGER.